March 20, 1945.  D. P. FAULK  2,372,068

ELECTRIC CONTROL CIRCUIT

Filed Jan. 23, 1943

WITNESSES:
E.A. McCloskey
John R. Shipman

INVENTOR
Donald P. Faulk.
BY
F. W. Lyle
ATTORNEY

Patented Mar. 20, 1945

2,372,068

UNITED STATES PATENT OFFICE 2,372,068

ELECTRIC CONTROL CIRCUITS

Donald P. Faulk, Wilkinsburg, Pa., assignor to Westinghouse Electric & Manufacturing Company, East Pittsburgh, Pa., a corporation of Pennsylvania Application January 23, 1943, Serial No. 473,317

11 Claims. (Cl. 250—27)

This invention relates to an electric control circuit and has particular relation to a control circuit for use in a system in which current is supplied to a load through electric discharge valves.

In resistance welding apparatus constructed in accordance with the teachings of the prior art, welding electrodes are connected across the secondary of a welding transformer and current is supplied to the transformer primary from an alternating current source through a pair of inversely connected ignitrons. For each weld the ignitrons are rendered conductive alternately in opposite half-periods of the source for a predetermined interval of time which is measured in terms of half-periods of the source. To obtain the desired degree of heat for a satisfactory weld, the instant in a half-period at which an ignitron is rendered conductive may be preselected according to the material to be welded. Such preselection is known as "heat control" and determines the effective value of the welding current.

In a seam welder, a series of welds are made at spaced intervals of time. In other words, current is supplied to the welding transformer in a plurality of discrete pulses, each of which extends over a plurality of half-periods with current flowing during a preselected portion of each half-period. On the other hand, in a spot welder, only a single pulse is supplied to the transformer for each operation of the machine. However, in actual practice the welding machine operator initiates operation of the machine several times in succession at spaced intervals. The operation of the spot welder is thus similar to that of a seam welder. In such resistance welding apparatus, it is highly desirable to supply current to the welding electrodes of the effective value corresponding to the selected heat control setting. However, changes in line potential and changes in the impedance of the welding transformer circuit such as may be caused by the introduction of different amounts of magnetic material between the welding electrodes, result in variations in the effective value of the current actually supplied during a current pulse although the heat control setting remains the same.

In the copending application of Clyde E. Smith, Serial No. 443,937, filed on May 21, 1942, and assigned to the Westinghouse Electric & Manufacturing Company, is disclosed an arrangement for compensating for the changes in line potential by changing the instant in a half-period at which an ignitron is rendered conductive in accordance with variations in the line potential. This change in the instant is accomplished by impressing in the control circuit of the ignitrons a potential the magnitude of which depends upon the magnitude of the line potential. However, the apparatus does not compensate for variations in the supply of current which occur for reasons other than variation in the line potential. It has been suggested that more accurate compensation could be obtained by varying the instant in a half-period at which an ignitron becomes conductive in accordance with the effective value of the current actually supplied to the welding transformer. To accomplish compensation in this manner with the usual apparatus, a potential must be developed which varies during each pulse with the effective value of the current. A satisfactory circuit for developing such a potential has not been available previously.

It is accordingly an object of my invention to provide a novel apparatus for developing a potential which varies in accordance with the effective value of current actually supplied to the welding transformer.

A general object of my invention is to provide a novel circuit for supplying current in spaced impulses through electric discharge valve means to a load, in which means are provided for maintaining the effective value of the current supplied substantially constant.

Another object of my invention is to provide novel apparatus for controlling the amount of energy supplied from a source of alternating potential to a load in a plurality of discrete pulses each of which is made up of a plurality of spaced impulses, in which means are provided to compensate for variations in the impedance of the load circuit and the magnitude of the source potential.

More specifically, it is an object of my invention to provide apparatus for supplying spaced current impulses from a source of potential to a load for a predetermined interval of time in which the amount of energy supplied during that interval is maintained substantially constant regardless of variations in the impedance of the transformer circuit and the magnitude of the source potential.

In accordance with my invention, a high vacuum regulator tube is employed to develop a potential which varies in accordance with variations in the effective value of the current supplied to the welding transformer from the main source. This potential is then used to vary the instant in a half-period of the main source at which the ignitrons become conductive, thereby tending to maintain the effective value of the current substantially constant. The regulator tube is of the type in which the magnitude of the anode current is determined primarily by the temperature of the cathode when the anode-cathode potential is above a predetermined magnitude. An auxiliary potential source is connected in series with a resistor, or other impedance, across the anode and cathode of the regulator tube to maintain the anode-cathode potential above said predetermined magnitude. The temperature of the cathode then controls the anode current and, therefore, the magnitude of the potential developed across the resistor by the flow of anode current therethrough.

To heat the cathode, a continuous unidirectional current of a magnitude which varies throughout each welding current pulse with the effective value of the welding current is supplied to the cathode through a full wave rectifier and a reactor from a current transformer coupled in the supply circuit of the welding transformer. When welding current flows in preselected portions which are less than the whole of successive half-periods of the source for a particular heat control setting, the reactor serves to maintain the flow of current through the cathode during that portion of each half-period in which welding current does not flow. As a result of this arrangement, the temperature of the cathode varies throughout each pulse with the effective value of the welding current.

The temperature of the cathode must, of course, be maintained within certain limits as determined by the regulator tube structure. The welding current variations from such causes as a drop in line potential or change in circuit impedance are ordinarily insufficient to vary the cathode heating current beyond the limits. However, the heat control setting may be adjusted over a wide range and so result in a cathode heating current outside the limits. To avoid such an undesirable occurrence, a voltage divider is interposed between the current transformer and the cathode of the regulator tube. An adjustable tap on the voltage divider may be set to fix the proportion of the current available from the current transformer which is supplied to the cathode. The adjustable tap on the divider is mechanically connected with the adjustable element in the heat control circuit so that when the heat control circuit is adjusted to increase the effective value of the welding current, the proportion of the current available from the secondary of the current transformer which is supplied to the cathode is decreased. On the other hand, when the heat control circuit is adjusted to decrease the welding current, the proportion supplied to the cathode is increased. Thus the cathode heating current is kept within the limits throughout each pulse regardless of the heat control setting.

Because an appreciable time is required to heat the cathode of the regulator tube, it is necessary to maintain the cathode in a heated condition between successive pulses of welding current. Otherwise the anode current of the regulator tube would not begin to follow the variations in the welding current until nearly the end of each pulse. According to my invention, an auxiliary source of potential is arranged to supply current through the cathode between pulses of welding current. An electric discharge valve of the arc like type, preferably a thyratron, is interposed between the auxiliary source and the cathode of the regulator tube to control the auxiliary heating of the cathode. The control circuit of the discharge valve is arranged to prevent the valve from becoming conductive so long as current is supplied through the cathode of the regulator tube from the current transformer. Upon cessation of the flow of current through the cathode from the current transformer, the discharge valve becomes conductive so that current is supplied through the cathode from the auxiliary source. The auxiliary source potential is preferably pulsating with the wave form of a fully rectified alternating potential of the same frequency and phase as the main source, and rises above the arc-drop of the valve in each pulsation and decreases below the arc-drop at the end of each pulsation. Consequently, during the interval between welding current pulses, the valve becomes conductive in each pulsation of the auxiliary potential and non-conductive at the end of each pulsation. When the next pulse of welding current is initiated, current flows from the current transformer through the cathode of the regulator tube and the valve is then prevented from becoming conductive in the next pulsation of the auxiliary potential.

It is to be understood that the auxiliary potential may have other than the preferred wave form, but it must have such a wave form as to effect a supply of current during the interval between successive pulses to maintain the cathode heated. The wave form of the auxiliary potential must also be such that the discharge valve becomes non-conductive at the beginning of the next welding current pulse. Because the number of half-periods of the main source in the intervals between pulses differ with the will of the operator, a periodically pulsating auxiliary potential of the preferred form is particularly advantageous.

The novel features that I consider characteristic of my invention are set forth with particularity in the claims. The invention itself, however, both as to its organization and its method of operation, together with additional objects and advantages thereof will best be understood from the following description of a specific embodiment when read in connection with the accompanying drawing.

Figures 1, 2:
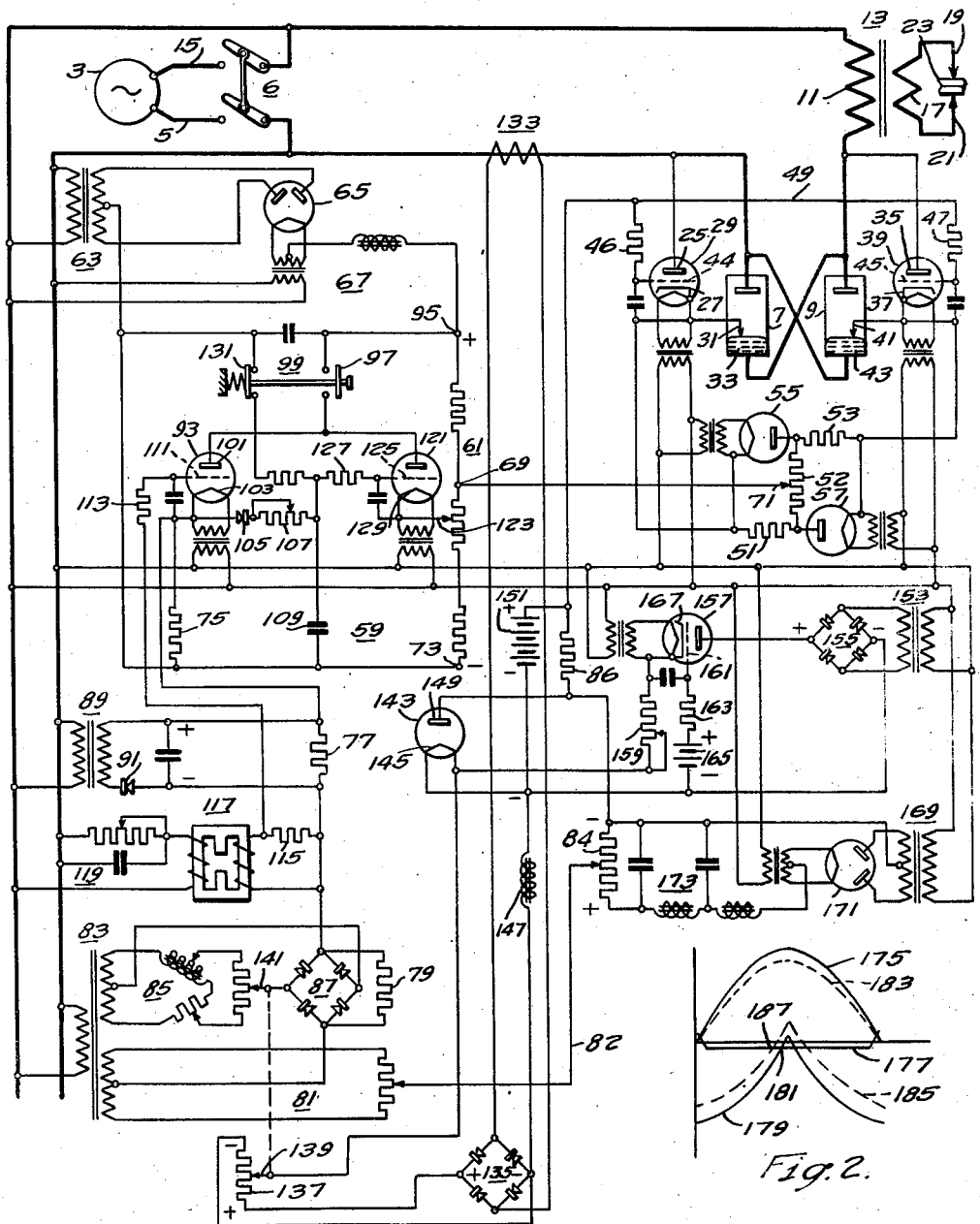
Figure 1 is a schematic diagram of a spot welder embodying my invention.
Fig. 2 is a graph illustrating the operation of the apparatus of Fig. 1.

In the apparatus as shown in Fig. 1, current is supplied from an alternating potential source 3 in a circuit extending from one terminal 5 of the source through a circuit breaker 6, a pair of inversely connected ignitrons 7 and 9, the primary 11 of a welding transformer 13, and the circuit breaker to the other terminal 15 of the source. The secondary 17 of the welding transformer 13 is connected across a pair of welding electrodes 19 and 21 in engagement with the material 23 to be welded.

The firing circuit for one of the ignitrons 7 may be traced from the terminal 5 of the source 3, through circuit breaker 6, the anode 25 and cathode 27 of an electric discharge firing valve 29, the igniter 31 and cathode 33 of the ignitron 7, the primary 11 of the welding transformer 13 and the circuit breaker to the other terminal 15 of the source. The firing circuit for the other ignitron 9 may be traced from the terminal 15, through the circuit breaker, primary 11, the anode 35 and cathode 37 of a second electric discharge firing valve 39, the igniter 41 and cathode 43 of the second ignitron 9 to the other terminal 5 of the source. It is thus apparent that the firing valves 29 and 39 are also connected inversely or in antiparallel in circuit with the source.

The firing valves 29 and 39 are of the arc-like type, preferably thyratrons, and their control electrodes 44 and 45 are interconnected through corresponding grid resistors 46 and 47 and a conductor 49. The cathodes 27 and 37 of the firing valves 29 and 39 are also interconnected through first, second and third resistors 51, 52 and 53. A gaseous discharge rectifier tube 55 is connected across the first and second resistors 51 and 52 and a second gaseous discharge rectifier tube 57 is connected across the second and third resistors 52 and 53. The rectifier tube 55 is arranged to conduct current away from the junction point of the first and second resistors 51 and 52, and rectifier tube 57 is arranged to conduct current away from the junction point of the second and third resistors 52 and 53.

A control system 59 is provided to supply a control potential for controlling the firing valves 27 and 37. The control system includes a voltage divider 61 energized from the source 3 through an auxiliary transformer 63, a full wave rectifier 65 and filtering elements 67. An intermediate tap 69 on the divider 61 is connected to a center tap 71 on the second resistor 52 interconnecting the cathodes of the firing valves 29 and 39. The negative terminal 73 of the divider 61 is connected to the control electrodes 44 and 45 of the firing valves. The circuit from the negative terminal 73 of the divider 61 may be traced through resistors 75, 77 and 79, a balancing potentiometer circuit 81, conductor 82, a portion of resistor 84, resistor 86, conductor 49 and resistor 46 to control electrode 44 or resistor 47 to control electrode 45. As will be explained hereinafter, the impressing of a control potential between the control electrodes of the firing valves and the center tap 71 is the same as impressing the control potential directly between the control electrode and cathode of the firing valve whose anode is positive at the time.

If ignitrons 7 and 9 are identical and firing valves 29 and 39 are identical, the balancing potentiometer circuit 81 is adjusted so that it does not supply a potential in the circuit. Therefore, the function of the balancing potentiometer may be omitted from immediate consideration and will be explained hereinafter.

A potential is impressed across the resistor 79 in the circuit between the negative terminal 73 of the divider 61 and the control electrodes of the firing valves. This potential is derived from the source 3 through an auxiliary transformer 83, a phase shifting circuit 85 and a full wave rectifier 87, so that the potential takes the form of a rectified alternating potential, inverted with respect to the control electrodes and displaced in phase relative to the source.

A direct-current potential is impressed across the resistor 77 in the circuit between the negative terminal 73 of the divider 61 and the control electrodes of the firing valves which is derived from the source 3 through an auxiliary transformer 89 and rectifier 91. The polarity of the potential across the resistor 77 is the same with respect to the control electrodes of the firing valves as the polarity of the potential across the portion of the divider 61 between the intermediate tap 69 and the negative terminal 73.

A direct current potential is also impressed in the circuit between the negative terminal of divider 61 and the control electrodes of the firing valves by means of resistors 84 and 86. The exact nature of this potential is discussed hereinafter, however, because of the large negative potential supplied from the divider 61, the resultant potential impressed between the control electrodes of the firing valves 29 and 39 and the center tap 71 of the second resistor 52 remains below the critical control electrode-cathode potential necessary to render the firing valves conductive.

Another electric discharge valve 93 of the arc-like type, preferably a thyratron hereinafter designated as the start valve, is connected across the voltage divider 61 in a circuit extending from the positive terminal 95 through a contactor 97 of a push-button switch 99, the anode 101 and cathode 103 of the start valve 93, and parallel circuits comprising the resistor 75 on one side and a rectifier 105, potentiometer 107 and capacitor 109 on the other side, to the negative terminal 73 of the divider 61. The control circuit of the start valve 93 may be traced from its control electrode 111, through a grid resistor 113, a resistor 115, and resistor 77 to the cathode 103. As previously set forth, a direct-current potential is impressed across the resistor 77, and this potential is of such polarity as to tend to maintain the start valve 93 nonconductive. Potential impulses are impressed across the other resistor 115 in the control circuit of the start valve through a peaking transformer 117 and a phase shifting circuit 119 energized from the source. The phase shifting circuit 119 is arranged to be adjusted according to the power factor of the load so that an impulse across the resistor 115 occurs at the beginning of each half-period of alternating current. The polarity and magnitude of the impulse across the resistor 115 at the beginning of a positive half-period of the source current is such that the impulse overcomes the biasing potential across the resistor 77 and renders the start valve 93 conductive if the push-button contactor 97 is closed.

When the start valve 93 becomes conductive, the upper end of the resistor 75 in series therewith is effectively connected to the positive terminal 95 of the divider 61. Consequently, the direct-current potential supplied from the divider to the circuit between the control electrodes of the firing valves and the center tap 71 of the resistor 52 becomes considerably less negative. The peaks of the inverse rectified potential in the circuit then rise above the critical control electrode-cathode potential necessary to render the firing valves conductive. This inverse rectified alternating potential is employed to determine the instant at which the firing valves 29 and 29 and, therefore, the ignitrons 7 and 9 become conductive in a half-period of the source. The particular instant is selected by adjustment of the phase shifting circuit 85 to shift the position of the peaks and determines the effective value of current supplied to the weld in a half-period, subject to variations resulting from changes in line potential and/or circuit impedance.

A second electric discharge valve 121 of the arc-like type, preferably a thyratron, which is hereinafter designated as a stop valve, is connected between the positive terminal 95 of the divider 61 and another intermediate tap 123 on the divider. The control circuit of the stop valve 121 may be traced from the control electrode 125 thereof through a grid resistor 127 and the capacitor 109 to the negative terminal 73 of the divider 61 and from the intermediate tap 123 to the cathode 129 of the stop valve. The potential between the negative terminal 73 and intermediate tap 123 of the divider normally biases the stop valve to maintain it nonconductive. However, when the start valve 93 is conductive, the capacitor 109 in series therewith is charged at a rate determined by the setting of the potentiometer 107. After a predetermined interval of time, the potential across the capacitor 109 rises to a sufficient magnitude to counteract the biasing potential in the control circuit of the stop valve 121 and render the stop valve conductive. When the stop valve 121 becomes conductive, the intermediate tap 123 is effectively connected to the positive terminal 95 of the divider so that the upper end of resistor 75 is again negative with respect to intermediate tap 69. A back contactor 131 on the push-button switch 99 is arranged to complete a discharge circuit for the capacitor 109 when the push-button switch is released.

From the foregoing description it is apparent that the potential between the control electrodes of the firing valves 29 and 39 and the center tap 71 of the second resistor 52 between the cathodes 27 and 37 originally comprises an inverse rectified alternating potential superimposed on a highly negative direct-current potential of such value that the ignitrons are not rendered conductive. When the push-button contactor 97 is closed, the direct-current potential becomes less negative while the inverse rectified alternating potential remains the same and the ignitrons are rendered conductive alternately at a selected instant in opposite half-periods. After a preselected interval of time determined by the setting of the potentiometer 107, the direct current potential again becomes negative to prevent the ignitrons from becoming conductive.

A consideration of the control circuits for the firing valves 29 and 39 reveals that the impressing of a control potential between the control electrodes 44 and 45 and the center tap 71 on resistor 52 is the same as impressing the potential between the control electrode and cathode of the valve whose anode is positive at the time. The control circuits are described in my copending application, Serial No. 463,989, filed October 30, 1942.

The three resistors 51, 52 and 53 interconnecting the cathodes 27 and 37 of the firing valves 29 and 39 are also connected across the source 3 through the igniters 31 and 41 and cathodes 33 and 43 of the ignitrons 7 and 9. Consequently, an alternating potential in phase with the source appears across these resistors. When the potential across the resistors 51, 52 and 53 is of such polarity that the cathode connected end of the first resistor 51 is negative, the first rectifier 55 becomes conductive to short-circuit the first and second resistors 51 and 52. It follows that the control potential impressed between the control electrodes 44 and 45 of the firing valves 29 and 39 and the center tap 71 of the second resistor 52 is then effectively impressed directly between the control electrode 44 and cathode 27 of the first firing valve 29. Similarly, when the cathode connected end of the third resistor 53 is negative, the second rectifier 57 becomes conductive to short-circuit the second and third resistors 52 and 53 and the control potential is effectively impressed between the control electrode 45 and cathode 37 of the second firing valve 39. Interference with the shape of the wave form of the control potential by the alternating potential across the three resistors is thus avoided. As a result, the control potential may be adjusted to rise above the critical value of the firing valves at any selected instant in a half-period and the ignitrons are rendered conductive at that selected instant.

Should the ignition characteristic of the two ignitrons be slightly different, the balance potentiometer 81 may be adjusted to add an alternating potential component to the control potential to raise alternate peaks of the inverse rectified alternating potential. As a result, the two ignitrons may be conductive for the same percentage of a half-period.

The primary winding of a current transformer 133 is connected in the supply circuit of the welding transformer 13 and the secondary of the current transformer 133 is connected across the input terminals of a full wave rectifier 135. A voltage divider 137 is energized from the output terminals of the rectifier. A high vacuum regulator tube 143, shown as a diode and preferably a Westinghouse RO—585 tube, has a cathode 145 which is heated by current passed therethrough in a circuit extending from the intermediate adjustable tap 139 on divider 137 through the cathode 145 and a reactor 147 to the negative terminal of the divider. The reactor 147 is of such dimensions as to maintain a flow of current through the cathode during that portion of a half-period in which welding current does not flow because of heat control. As the current induced in the current transformer is proportional to the welding current, the direct current component of the cathode heating current varies with variations in the effective value of the welding current.

The regulator tube 143 is of the type in which the magnitude of the anode current is determined primarily by the cathode temperature when the anode-cathode potential is above a predetermined magnitude. In the circuit of Fig. 1, the anode 149 of the regulator tube 143 is connected through the resistor 86 and a source of substantially constant potential 151 to the cathode. The magnitude of the potential supplied from the source 151 is such that the anode-cathode potential is above the predetermined magnitude necessary to give control to the cathode temperature. The cathode temperature of the regulator tube 143 is determined by the magnitude of the direct current component of the current flowing therethrough. Therefore, the potential developed across the resistor 86 by the flow of anode current therethrough is continuous and varies in accordance with the effective value of the welding current.

The adjustable tap 139 on divider 137 is mechanically connected to the adjustable tap 141 in the heat control phase shifting circuit 85. By virtue of this connection, when the adjustable tap 141 on the phase shifting circuit is adjusted to increase or decrease the effective value of the welding current, the voltage divider tap 139 is adjusted so that a smaller or larger part, respectively, of the divider potential is impressed across the terminals of the cathode 143.

The fact that an appreciable time is required to heat the cathode must also be considered. The welding circuit illustrated in Fig. 1 provides but a single pulse of current extending over only a few periods of the source for each operation of the push-button switch 99. For certain thin materials, a welding pulse may extend over only two or three periods of the source. As set forth hereinbefore, the welding machine operator initiates operation of the machine several times in succession in actual practice, or the machine may be equipped with a repeat circuit to accomplish repeated operation automatically. In either case a series of discrete pulses of welding current is provided. Since with a Westinghouse RO—585 tube or a similar regulator tube, about two periods of current are required to heat the cathode to the operating temperature, the cathode must be preheated and the heat must be maintained between successive pulses. For this purpose an auxiliary potential is employed which is derived from the main source through a transformer 153 and a full wave rectifier 155. The positive terminal of rectifier 155 is connected through an electric discharge valve 157 of the arc-like type, preferably a thyratron, and a variable resistor 159 to the terminal of the cathode 145 which is connected to the top 139 on the divider 137. The other terminal of cathode 145 is connected directly to the negative terminal of the rectifier 155. The auxiliary potential is pulsating and has the wave form of a fully rectified alternating potential of the same frequency and phase as the main source. The magnitude of the auxiliary potential rises above the arc-drop of the valve 157 in each pulsation thereof and, of course, decreases below the arc-drop at the end of each pulsation.

The control circuit of valve 157 extends from the control grid 161 thereof through grid resistor 163 and a source of potential 165, the cathode 145 of the regulator tube 143 and resistor 159 to the cathode 167 of valve 157. The potential source 165 tends to render valve 157 conductive but during a welding current pulse, current flowing from the divider 137 develops a potential across the cathode 145 of the regulator tube of such polarity and magnitude as to prevent valve 157 from becoming conductive. It is to be noted that the reactor 147 maintains current flow through the cathode 145 of the regulator tube during that portion of a half-period of the main source in which welding current does not flow by reason of the heat control setting. It is then evident that valve 157 permits a flow of current to the cathode 145 from the auxiliary source only in the interval between welding current pulses. Because of the wave form of the auxiliary potential, valve 157 is rendered conductive at the beginning of each half-period of the main source and becomes nonconductive at the end of each half-period in the interval between welding current pulses. Since the valve 157 becomes nonconductive at the end of each half-period of the main source, the auxiliary potential is effective to maintain the cathode heated between welding current pulses while avoiding undue interference with the regulator tube operation during a pulse, regardless of the selected length of the pulses and intervals.

A direct current potential is established across resistor 84 which is derived from the source 3 through another transformer 169, a rectifier 171 and filtering elements 173. The potential across resistor 84 is of opposite polarity to the potential across the resistor 86 in the regulator tube circuit. Moreover, the difference in magnitudes of the potentials across resistor 86 and the portion of resistor 84 in the control circuit of the firing valves is small compared to the magnitude of each individual potential. Consequently, a small variation in the effective value of the welding current causes a variation of a considerably higher percentage in the algebraic sum of the potentials of resistor 86 and the portion of resistor 84 in the control circuit.

The effect of a variation in the algebraic sum of the potentials of resistor 86 and the portion of resistor 84 in the control circuit is apparent in Fig. 2. The solid line curve 175 illustrates the anode potential impressed on one of the firing valves in a positive half-period. The critical potential of the firing valve is represented by another curve 177. Still another solid line curve 179 represents the control potential impressed between the grid and cathode of the firing valve while the start valve 93 is conductive. Because of the particular heat control setting, the control potential curve 179 first rises above the critical potential curve 177 at the point 181 causing the firing valve and the corresponding ignitron to become conductive at that instant. Should the effective value of the welding current conducted through the ignitron decrease for any reason, as for example, because of a decrease in line voltage to the dotted curve 183, the potential across the resistor 86 varies accordingly and the direct current component of the control potential of the firing valve is varied thereby so that the resultant control potential is raised, as illustrated by the dotted curve 185. When the control potential curve is raised in this manner, the instant at which it rises above the critical potential curve 177 advances to the point 187. The ignitron is then rendered conductive at an instant earlier in the half-period so that the effective value of the welding current remains substantially constant. Of course, if the effective value is increased, the ignitron is rendered conductive later in a half-period.

It is to be understood that the potential developed across the resistor 86 may also be used in other ways than that illustrated. It may be employed to effect some other adjustment of the apparatus or to control an indicating mechanism. Although I have shown and described a preferred embodiment of my invention, I am fully aware that many modifications thereof are possible. My invention, therefore, is not to be restricted except insofar as is necessitated by the prior art and by the spirit of the appended claims.

I claim as my invention:

1. In combination, a high vacuum discharge device having an anode and cathode, said device being of the type in which the magnitude of the anode current is determined primarily by the cathode temperature when the anode-cathode potential is above a predetermined magnitude, a first source of potential in circuit with said anode and cathode to establish an anode-cathode potential above said predetermined magnitude, a load device in circuit with said anode and cathode and first source to be energized by the anode current, said cathode having a pair of terminals, means connected to said terminals for supplying current through said cathode in discrete pulses to heat it, a second source of potential connected across said terminals, and electric discharge valve means interposed between said second source and said cathode and responsive to the potential across said terminals to permit current flow from said second source through said cathode only in the intervals between successive pulses.

2. In combination, a high vacuum discharge device having an anode and cathode, said device being of the type in which the magnitude of the anode current is determined primarily by the cathode temperature when the anode-cathode potential is above a predetermined magnitude, a first source of potential in circuit with said anode and cathode to establish an anode-cathode potential above said predetermined magnitude, a load device in circuit with said anode and cathode and first source to be energized by the anode current, said cathode having a pair of terminals, means connected to said terminals for supplying current through said cathode in discrete pulses to heat it, a second source of potential connected across said terminals, electric discharge valve means interposed between said second source and cathode to control current flow from said second source through said cathode, and control means connected to said valve means and including means tending to render said valve means conductive, said control means being responsive to the flow of current through said cathode during each of said pulses to prevent said valve means from becoming conductive.

3. In combination, a high vacuum discharge device having an anode and cathode, said device being of the type in which the magnitude of the anode current is determined primarily by the cathode temperature when the anode-cathode potential is above a predetermined magnitude, a first source of potential in circuit with said anode and cathode to establish an anode-cathode potential above said predetermined magnitude, a load device in circuit with said anode and cathode and first source to be energized by the anode current, said cathode having a pair of terminals, means connected to said terminals for supplying a unidirectional current through said cathode in discrete pulses to heat it, a second source of potential connected across said terminals, an electric discharge valve having a plurality of principal electrodes interposed between said second source and said cathode and a control electrode, and conducting means connecting said control electrode to one of said principal electrodes through a third source of potential and said cathode, said third source potential being of a polarity tending to render said valve conductive and the potential developed across said cathode by the flow of current therethrough during each of said pulses being of such polarity and magnitude as to prevent said valve from becoming conductive.

4. In combination, a high vacuum discharge device having an anode and cathode, said device being of the type in which the magnitude of the anode current is determined primarily by the cathode temperature when the anode-cathode potential is above a predetermined magnitude, a first source of potential in circuit with said anode and cathode to establish an anode-cathode potential above said predetermined magnitude, a load device in circuit with said anode and cathode and first source to be energized by the anode current, said cathode having a pair of terminals, means connected to said terminals for supplying current through said cathode in discrete pulses to heat it, a second source of periodically pulsating potential connected across said terminals, and an electric discharge valve of the arc-like type interposed between said second source and cathode and responsive to the potential across said terminals to permit current flow from said second source through said cathode only in the intervals between successive pulses, said periodically pulsating potential rising above the arc-drop of said valve in each pulsation and decreasing below the arc-drop at the end of each pulsation.

5. In combination, a high vacuum discharge device having an anode and cathode, said device being of the type in which the magnitude of the anode current is determined primarily by the cathode temperature when the anode-cathode potential is above a predetermined magnitude, a source of potential in circuit with said anode and cathode to establish an anode-cathode potential above said predetermined magnitude, a load device in circuit with said anode and cathode and source to be energized by the anode current, said cathode having a pair of terminals, means connected to said terminals for supplying current through said cathode in discrete pulses to heat it, a second source of periodically pulsating potential connected across said terminals, and an electric discharge valve of the arc-like type having a plurality of principal electrodes interposed between said second source and said cathode and a control electrode, and means connecting said control electrode to one of said principal electrodes through said cathode and including a third source of potential of a polarity tending to render said valve conductive at the beginning of each pulsation of said second source, the potential developed across the terminals of said cathode by the passage of each of said current pulses therethrough being of a magnitude and polarity to prevent said valve from becoming conductive.

6. In combination, a high vacuum discharge device having an anode and cathode, said device being of the type in which the magnitude of the anode current is determined primarily by the cathode temperature when the anode-cathode potential is above a predetermined magnitude, a source of potential in circuit with said anode and cathode to establish an anode-cathode potential above said predetermined magnitude, a load device in circuit with said anode and cathode and source to be energized by the anode current, said cathode having a pair of terminals, means connected to said terminals for supplying current through said cathode in discrete pulses to heat it, a second source of periodically pulsating potential connected across said terminals, an electric discharge valve of the arc-like type interposed between said second source and said cathode to control the flow of current from said second source through said cathode, and control means connected to said valve means and including means tending to render said valve means conductive, said control means being responsive to the flow of current through said cathode during each of said pulses to prevent said valve means from becoming conductive.

7. In combination, a high vacuum discharge device having an anode and cathode, said device being of the type in which the magnitude of the anode current is determined primarily by the cathode temperature when the anode-cathode potential is above a predetermined magnitude, a first source of potential in circuit with said anode and cathode to establish an anode-cathode potential above said predetermined magnitude, a load device in circuit with said anode and cathode and first source to be energized by the anode current, said cathode having a pair of terminals, means connected to said terminals for supplying current through said cathode in discrete pulses to heat it, said means being such that the interval between successive pulses may vary over a wide range, a second source of potential connected across said terminals, and an electric discharge valve of the arc-like type interposed between said second source and said cathode and responsive to the potential across said terminals to control current flow from said second source through said cathode, said second source potential being periodically pulsating and rising above the arc-drop of said valve in each pulsation and decreasing below the arc-drop at the end of each pulsation with each pulsation being substantially the length of the minimum interval between successive pulses.

8. For use with a main circuit through which current is supplied in a plurality of discrete pulses, each pulse being made up of a plurality of spaced sub-impulses, the combination comprising a high vacuum discharge device having an anode and cathode, said device being of the type in which the magnitude of the anode current is determined primarily by the cathode temperature when the anode-cathode potential is above a predetermined magnitude, a first source of potential in series with said anode and cathode to establish an anode-cathode potential above said predetermined magnitude, a load device in circuit with said anode and cathode and first source to be energized by the anode current, said cathode having a pair of terminals, means coupled to said main circuit and connected to said terminals for supplying a unidirectional current through said cathode to heat it throughout each of said pulses of a magnitude which varies as the effective value of said sub-impulses, a second source of potential connected across said terminals, and electric discharge valve means interposed between said second source and said cathode and responsive to the potential across said terminals to prevent current flow from said second source during each of said impulses and permit current flow from said second source between said impulses.

9. For use with a main circuit through which current is supplied from a main alternating potential source in a plurality of discrete pulses, each pulse being made up of a plurality of half-periods of said main source with current flowing in a preselected portion of each of said half-periods, the combination comprising a high vacuum discharge device having an anode and cathode, said device being of the type in which the magnitude of the anode current is determined primarily by the cathode temperature when the anode-cathode potential is above a predetermined magnitude, a second source of potential in circuit with said anode and cathode to establish an anode-cathode potential above said predetermined magnitude, a load device in circuit with said anode and cathode and first source to be energized by the anode current, said cathode having a pair of terminals, means for supplying a unidirectional current of a magnitude which varies with the effective value of said sub-impulses through said cathode to heat it throughout each of said pulses comprising a current transformer coupled to said main circuit and connected through a full-wave rectifier and a reactor to said terminals, a second source of potential connected across said terminals, and electric discharge valve means interposed between said second source and said cathode and responsive to the potential across said terminals to prevent current flow from said second source during each of said impulses and permit current flow from said second source between said impulses.

10. For use with a main circuit through which current is supplied in a plurality of discrete pulses, each pulse being made up of a plurality of spaced sub-impulses, the combination comprising a high vacuum discharge device having an anode and cathode, said device being of the type in which the magnitude of the anode current is determined primarily by the cathode temperature when the anode-cathode potential is above a predetermined magnitude, a first source of potential in series with said anode and cathode to establish an anode-cathode potential above said predetermined magnitude, a load device in circuit with said anode and cathode and first source to be energized by the anode current, said cathode having a pair of terminals, means coupled to said main circuit and connected to said terminals for supplying a unidirectional current through said cathode to heat it throughout each of said pulses of a magnitude which varies as the effective value of said sub-impulses, a second source of periodically pulsating potential connected across said terminals, and an electric discharge valve of the arc-like type having a plurality of principal electrodes interposed between said second source and said cathode and a control electrode, and means connecting said control electrode to one of said principal electrodes through said cathode and including a third source of potential of a polarity tending to render said valve conductive, the potential developed across the terminals of said cathode being of a magnitude and polarity to prevent said valve from becoming conductive.

11. For use in supplying current from a first source to a first load, the combination comprising control means connected in circuit between said first source and load to permit a flow of current therebetween in a series of spaced impulses including adjusting means for selecting the effective value of the current in each impulse, a high vacuum discharge device having an anode and a cathode, said device being of the type in which the magnitude of the anode current is determined primarily by the cathode temperature when the anode-cathode potential is above a predetermined magnitude, a second source of potential in circuit with said anode and cathode to establish an anode-cathode potential above said predetermined magnitude, a second load device in circuit with said anode and cathode and second source to be energized by the anode current, said cathode having a pair of terminals, means coupled to said circuit between said first source and load and connected to said terminals for supplying a current through said cathode to heat it of an effective value proportional to the effective value of the current supplied to said first load and including a voltage divider having an adjustable element for determining the value of said heating current in proportion to said first load current, and means interconnecting the adjusting means of said control means and said adjustable element of said divider whereby an adjustment of the adjusting means of said control means to increase or decrease the effective value of said first load current causes a decreases or increase, respectively, of the proportional relationship of said heating current to said first load current.

DONALD P. FAULK.